Patented Oct. 6, 1936

2,056,787

UNITED STATES PATENT OFFICE 2,056,787

CELLULOSE DERIVATIVE COMPOSITIONS

Albert L. Henne, Columbus, Ohio, assignor, by mesne assignments, to General Motors Corporation, a corporation of Delaware No Drawing. Application January 30, 1931, Serial No. 512,474

7 Claims. (Cl. 106—37)

This invention relates to chemistry and chemical processes, and more particularly to chemical processes for use in the manufacture of photographic films.

In the manufacture of photographic films having as a base some compound of cellulose, it is customary to dissolve the cellulose compound in an organic solvent, such as acetone, alcohol, or ether mixtures to produce a pasty mass. This pasty mass is then formed into long, thin, continuous sheets in any convenient manner, and the volatile solvent is then evaporated, leaving the cellulose base in substantially the form desired. The organic solvents heretofore used in the manufacture of the photographic films have been toxic, and/or form with air an explosive mixture. In addition, when working with such solvents, it is necessary to maintain the atmosphere in a perfectly dry state. It follows that the conditions under which the workmen labor are disagreeable and dangerous.

The principal objects of my present invention are to provide a process for overcoming these difficulties.

Certain halo-fluoro derivatives of aliphatic hydrocarbons are non-toxic, non-inflammable, volatile, and very good organic solvents.

According to my invention one or more, or a combination of one or more of these halo-fluoro derivatives of hydrocarbons is or are used as the organic solvent in the manufacture of photographic films. As a specific example, trifluoro-trichloroethane, $C_2Cl_3F_3$, having a boiling point of approximately 47° C., is capable of readily dissolving cellulose nitrate or other compounds used in films. In carrying out my invention, the base forming substance, or the cellulose compounds, such as cellulose acetate or cellulose nitrate, are first dissolved in the trichlorotrifluoroethane to form more or less of a pasty mass. This mass may be contained in any of the conventional machines utilized for forming it into long continuous films of the thickness desired. For example, the mass may be contained in an open-top tub and there may be arranged in combination therewith a rotating drum adapted to have its lower surface immersed within the pasty mass contained in the tub. As the drum rotates, a thin layer of the pasty mass will adhere thereto. The volatile solvent, trichlorotrifluoroethane, will evaporate, leaving a thin layer of the base forming substance, such as cellulose compounds, on the rotating drum. This layer may be removed by scraping so as to form a long thin continuous strip or sheet. To aid in the evaporation of the organic solvent, the entire apparatus may be located under a hood and air may be forced over the exposed surfaces of the rotating drum to facilitate the evaporation of the organic solvent.

Such a process may be carried out without any fear of injury to the workmen, for the trichlorotrifluoroethane is non-toxic and its vapors, when mixed with air, are non-inflammable and non-explosive. In addition, such a process may be carried out in the normal atmosphere.

One reason for using trichlorotrifluoroethane in the specific example is that the boiling point of this compound is approximately 47° C. Other substances, such as $CCl_3F$, $CCl_2F_2$, $CClF_3$, or any of the halo-fluoro derivatives of the methane homologs such as $C_2Cl_5F$, $C_2Cl_4F_2$, $C_2Cl_3F_3$, $C_2Cl_2F_4$, or $C_2Cl_2F_2$ may be used. Consequently, my invention should not be limited to the use of the trichlorotrifluoroethane, nor to the ethane group, but should be limited only to the use of halo-fluoro derivatives of aliphatic hydrocarbons as the organic solvent for the base forming material used in the manufacture of photographic films.

Inflammability and toxicity are relative terms. On the basis of non-inflammability, I prefer not to use compounds in which more hydrogen atoms are present in the molecule than the total halogen atoms present and wherever the term non-inflammable is used in the claims, this term carries this limitation. On a basis of non-toxicity alone, I prefer compounds in which the number of hydrogen atoms and halogen atoms other than fluorine do not surpass the number of fluorine atoms in the molecule. Wherever the word non-toxic is employed in the claims it carries this limitation.

What is claimed is as follows:

1. A composition comprising a cellulose derivative and, as a low boiling solvent therefor, a mixed fluorinated halogenated hydrocarbon of the lower aliphatic series.

2. A composition comprising a cellulose derivative and, as a low boiling solvent therefor, a mixed fluorinated halogenated ethane.

3. A composition comprising a cellulose derivative and, as a low boiling solvent therefor, a halo-fluoro derivative of an aliphatic hydrocarbon.

4. A composition comprising a cellulose derivative and, as a low boiling solvent therefor, trichloro-trifluoro-ethane.

5. A composition comprising a cellulose derivative and, as a low boiling solvent therefor, a chloro-fluoro derivative of an aliphatic hydrocarbon.

6. A composition comprising a cellulose derivative and, as a low boiling solvent therefor, a non-inflammable halo-fluoro derivative of an aliphatic hydrocarbon.

7. A composition comprising a cellulose derivative and, as a low boiling solvent therefor, a chloro-fluoro derivative of ethane.

ALBERT L. HENNE.